US008150690B2

(12) United States Patent
Huang

(10) Patent No.: US 8,150,690 B2
(45) Date of Patent: Apr. 3, 2012

(54) SPEECH RECOGNITION SYSTEM AND METHOD WITH CEPSTRAL NOISE SUBTRACTION

(75) Inventor: Shih-Ming Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 823 days.

(21) Appl. No.: 12/243,303

(22) Filed: Oct. 1, 2008

(65) Prior Publication Data

US 2009/0157400 A1    Jun. 18, 2009

(30) Foreign Application Priority Data

Dec. 14, 2007  (TW) .............................. 96148135 A

(51) Int. Cl.
    *G10L 15/06* (2006.01)
(52) U.S. Cl. ..................... 704/243; 704/256.8; 704/222; 704/250; 704/236; 704/233
(58) Field of Classification Search .................. 704/243, 704/250, 233, 236, 256.8, 222, 231, 255, 704/238, 248, 203, 256, 240, 251, 207, 246
    See application file for complete search history.

(56) References Cited

U.S. PATENT DOCUMENTS

| | | | | |
|---|---|---|---|---|
| 5,583,961 A | * | 12/1996 | Pawlewski et al. | 704/241 |
| 5,778,342 A | * | 7/1998 | Erell et al. | 704/256.8 |
| 5,895,447 A | * | 4/1999 | Ittycheriah et al. | 704/231 |
| 6,006,175 A | * | 12/1999 | Holzrichter | 704/208 |
| 6,032,116 A | * | 2/2000 | Asghar et al. | 704/238 |
| 6,044,343 A | * | 3/2000 | Cong et al. | 704/236 |
| 6,202,047 B1 | * | 3/2001 | Ephraim et al. | 704/256.6 |
| 6,253,173 B1 | * | 6/2001 | Ma | 704/222 |
| 6,278,970 B1 | * | 8/2001 | Milner | 704/203 |
| 6,347,297 B1 | * | 2/2002 | Asghar et al. | 704/243 |
| 6,418,412 B1 | * | 7/2002 | Asghar et al. | 704/256.5 |
| 6,449,594 B1 | | 9/2002 | Hwang et al. | |
| 6,633,842 B1 | * | 10/2003 | Gong | 704/233 |
| 6,678,655 B2 | * | 1/2004 | Hoory et al. | 704/223 |
| 6,691,090 B1 | * | 2/2004 | Laurila et al. | 704/250 |
| 6,804,643 B1 | | 10/2004 | Kiss et al. | |
| 6,859,773 B2 | * | 2/2005 | Breton | 704/226 |
| 7,035,797 B2 | * | 4/2006 | Iso-Sipila | 704/227 |

(Continued)

FOREIGN PATENT DOCUMENTS

JP    2002-132289 A    5/2002

(Continued)

OTHER PUBLICATIONS

Furui, S., et al., "Cepstral Analysis Technique for Automatic Speaker Verification", IEEE Transactions on Acoustics, Speech, and Signal Processing, 1981 vol. ASSP-29, No. 2, pp. 254-272.

(Continued)

*Primary Examiner* — Vijay B Chawan
(74) *Attorney, Agent, or Firm* — Connolly Bove Lodge & Hutz LLP

(57) ABSTRACT

The invention relates to a speech recognition system and method with cepstral noise subtraction. The speech recognition system and method utilize a first scalar coefficient, a second scalar coefficient, and a determining condition to limit the process for the cepstral feature vector, so as to avoid excessive enhancement or subtraction in the cepstral feature vector, so that the operation of the cepstral feature vector is performed properly to improve the anti-noise ability in speech recognition. Furthermore, the speech recognition system and method can be applied in any environment, and have a low complexity and can be easily integrated into other systems, so as to provide the user with a more reliable and stable speech recognition result.

18 Claims, 6 Drawing Sheets

U.S. PATENT DOCUMENTS

| | | | |
|---|---|---|---|
| 7,065,487 | B2 | 6/2006 | Miyazawa |
| 7,389,230 | B1* | 6/2008 | Nelken .......... 704/255 |
| 7,877,255 | B2* | 1/2011 | Zlokarnik .......... 704/252 |
| 2002/0035471 | A1* | 3/2002 | Breton .......... 704/233 |
| 2003/0078777 | A1* | 4/2003 | Shiau .......... 704/251 |
| 2003/0115054 | A1* | 6/2003 | Iso-Sipila .......... 704/233 |
| 2006/0053008 | A1* | 3/2006 | Droppo et al. .......... 704/234 |
| 2007/0083365 | A1 | 4/2007 | Shmunk |
| 2007/0088542 | A1 | 4/2007 | Vos et al. |
| 2008/0021707 | A1* | 1/2008 | Bou-Ghazale et al. ....... 704/248 |
| 2008/0154595 | A1* | 6/2008 | Nelken .......... 704/240 |
| 2008/0300875 | A1* | 12/2008 | Yao et al. .......... 704/236 |

FOREIGN PATENT DOCUMENTS

| | | |
|---|---|---|
| JP | 2003-271190 A | 9/2003 |
| JP | 2006-145694 A | 6/2006 |
| JP | 2007-156354 A | 6/2007 |
| TW | 200411629 | 12/1991 |
| TW | 466471 B | 4/2000 |

OTHER PUBLICATIONS

Notice of Allowance with Search Report issued on Oct. 26, 2011 for the corresponding Taiwan, R.O.C. Patent Application No. 096148135.

Office Action issued Aug. 30, 2011 for the corresponding Japanese Patent Application No. 2008-317530.

Shozakai, M., et al., *An Evaluation of Speech Enhancement Approach E-CMN/CSS for Speech Recognition in Car Environments* (1998), vol. J81-D-II, No. 1, The Transactions of the Institute of Electronics, Information and Communication Engineers D-II, pp. 1-9.

\* cited by examiner

SPEECH RECOGNITION SYSTEM AND METHOD WITH CEPSTRAL NOISE SUBTRACTION

BACKGROUND OF THE INVENTION

1. Field of the Invention

The present invention relates to a speech recognition system and method, more particularly to a speech recognition system and method with cepstral noise subtraction.

2. Description of the Related Art

Speech is the most direct method of communication for human beings, and computers used in daily life also have a speech recognition function. For example, the Windows XP operating system of Microsoft provides this function, and so does the latest Windows Vista operating system. Also, the latest operating system Mac OS X of another company, Apple, provides a speech recognition function.

No matter whether a microphone is used to carry out the speech recognition function on a computer using Microsoft Windows XP/Vista or Apple Mac OS X or a phone call is made through the service provided by Google and Microsoft, the speech will be processed by an electronic device such as a microphone or a telephone, which may interfere with the voice signal. Also, other background noises, e.g., sounds made by air conditioners or people walking, may also greatly reduce the speech recognition rate. Therefore, a good anti-noise speech recognition technique is in high demand.

The conventional cepstral mean subtraction (CMS) used for speech recognition (see paper [1] in the prior art Furui, "Cepstral analysis technique for automatic speaker verification," IEEE Transaction on Acoustics, Speech and Signal Processing, 29, pp. 254-272, 1981.) has become a widely used feature processing method for enhancing the anti-noise ability in speech recognition.

U.S. Pat. No. 6,804,643 has also disclosed a cepstral feature processing method as shown in FIG. 1. In Step S11, first cepstral mean vectors of all the voice frames before the current voice frame are first calculated. In Step S12, a sampling value is then received, i.e., the cepstral feature vector of the current voice frame is used. In Step S13, the cepstral feature vector of the current voice frame has an estimated mean vector added. The estimated mean vector is an adjustment factor multiplied by a cepstral mean vector of the preceding voice frame. In Step S14, a new estimated cepstral feature vector is calculated.

Therefore, it is necessary to provide a speech recognition system with cepstral noise subtraction to improve the function of anti-noise speech recognition.

SUMMARY OF THE INVENTION

The present invention provides a speech recognition system with cepstral noise subtraction which includes a filterbank energy extractor, a cepstral noise subtraction device, a cepstral converter, a model trainer, and a speech recognizer. The filterbank energy extractor obtains a plurality of first feature vectors according to a voice signal. The cepstral noise subtraction device obtains a first feature vector of a preset voice frame and first feature vectors of a plurality of voice frames before the preset voice frame, so as to calculate a feature mean vector, and calculate a second feature vector of a preset voice frame according to the first feature vector, the feature mean vector, a first scalar coefficient, and a second scalar coefficient of the preset voice frame. The cepstral converter converts the second feature vector of the preset voice frame into a cepstral feature vector. The model trainer calculates a model parameter according to the cepstral feature vector. The speech recognizer calculates a recognized voice signal according to the cepstral feature vector and the model parameter.

The present invention provides a speech recognition method with cepstral noise subtraction which includes the following steps. A plurality of first feature vectors is obtained according to a voice signal. A first feature vector of a preset voice frame and first feature vectors of a plurality of voice frames before the preset voice frame are obtained to calculate a feature mean vector. A second feature vector of a preset voice frame is calculated according to a first feature vector, the feature mean vector, a first scalar coefficient, and a second scalar coefficient of the preset voice frame. The second feature vector of the preset voice frame is converted into a cepstral feature vector. A model parameter is calculated according to the cepstral feature vector. A recognized voice signal is calculated according to the cepstral feature vector and the model parameter.

According to the speech recognition system and method of the present invention, the process for the cepstral feature vector is limited, so as to avoid excessive enhancement and subtraction in the cepstral feature vector, so that its operation is completed properly, and the anti-noise ability for speech recognition is improved. Furthermore, the speech recognition system and method can be applied in any environment, and have a low complexity and can be easily integrated into other systems, so as to provide the user with a more reliable and stable speech recognition result.

DETAILED DESCRIPTION OF THE INVENTION

Figure 2:
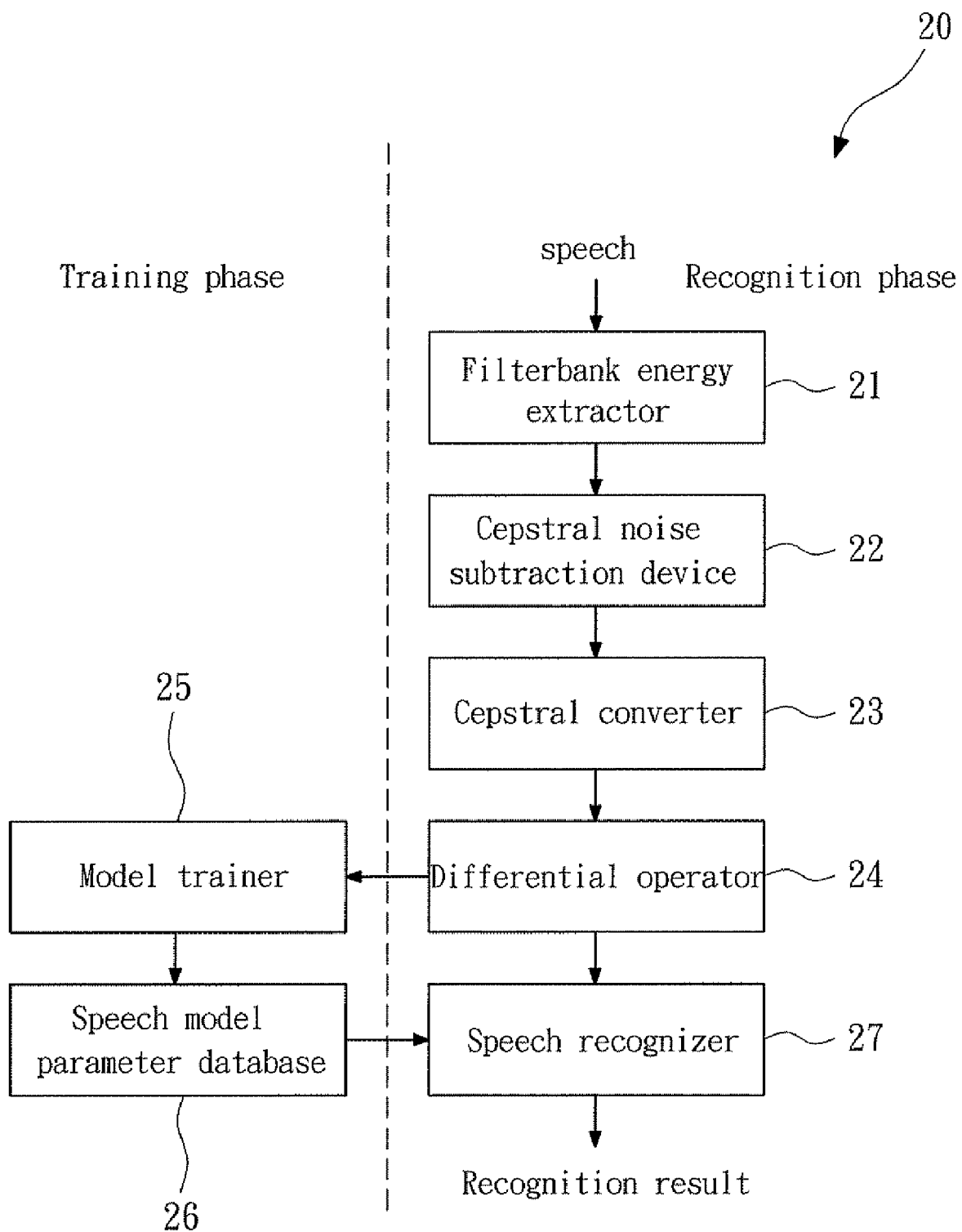
FIG. 2 is a schematic block diagram of a speech recognition system with cepstral noise subtraction according to the present invention.

FIG. 2 is a schematic block diagram of a speech recognition system with cepstral noise subtraction according to the present invention. According to the present invention, the speech recognition system 20 with cepstral noise subtraction includes a filterbank energy extractor 21, a cepstral noise subtraction device 22, a cepstral converter 23, a model trainer 25, and a speech recognizer 27. The filterbank energy extractor 21 obtains a plurality of first feature vectors according to a voice signal. In this embodiment, the filterbank energy extractor 21 is a log Mel filterbank energy extractor. By the use of the log Mel filterbank energy extractor, the first feature vectors are log Mel filterbank energy feature vectors.

The cepstral noise subtraction device 22 obtains a first feature vector of a preset voice frame and first feature vectors of a plurality of voice frames before the preset voice frame, so as to calculate a feature mean vector, and calculate a second feature vector of a preset voice frame according to the first feature vector, the feature mean vector, a first scalar coefficient, and a second scalar coefficient of the preset voice frame.

Figure 4:
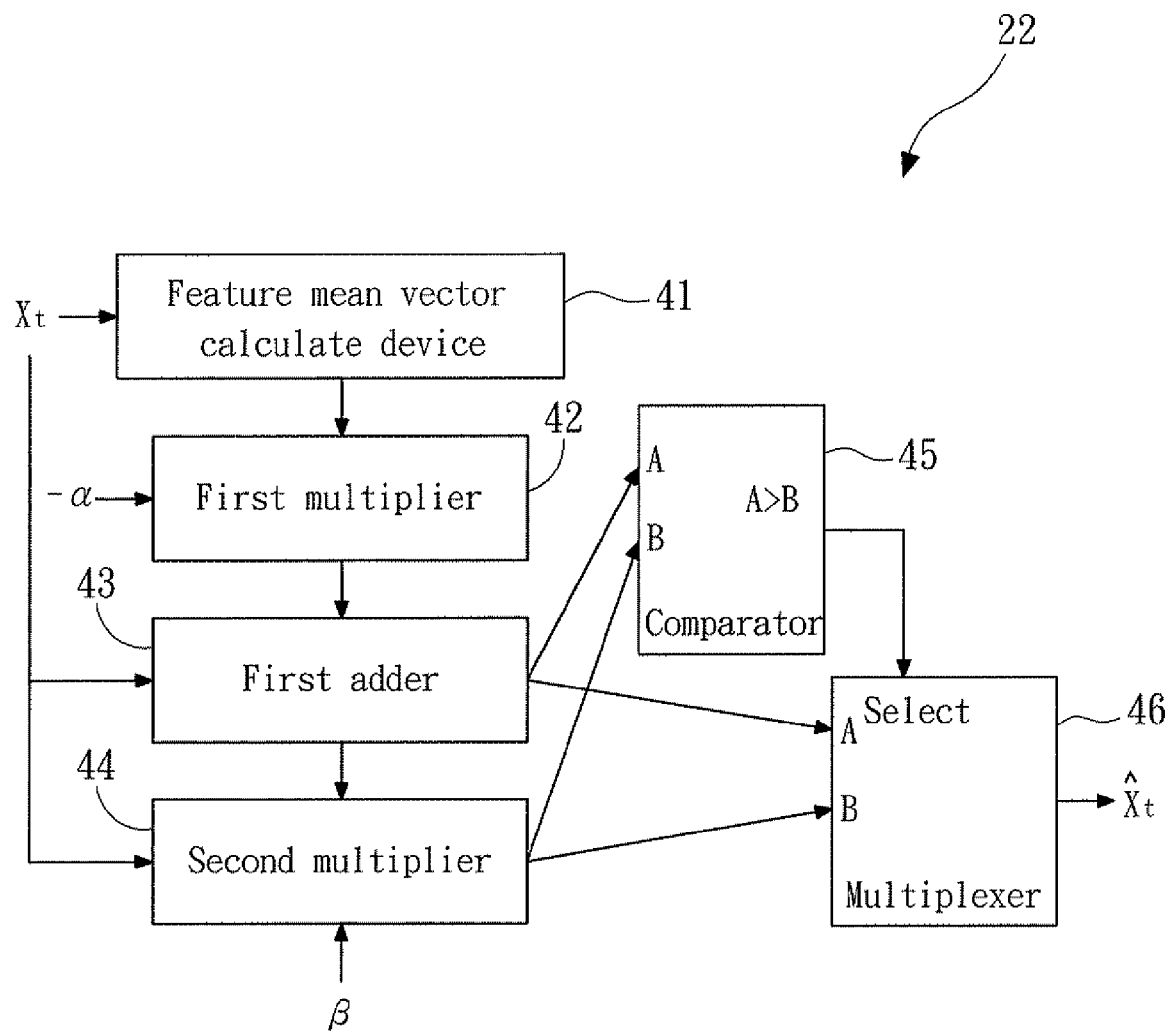
FIG. 4 is a schematic block diagram of the cepstral noise subtraction device according to the present invention.

FIG. 4 is a schematic block diagram of the cepstral noise subtraction device according to the present invention. The cepstral noise subtraction device 22 of the present invention includes a feature mean vector calculator device 41, a first multiplier 42, a first adder 43, a second multiplier 44, a comparator 45, and a multiplexer 46. The feature mean vector calculator device 41 obtains the first feature vector of the preset voice frame and the first feature vectors of the plurality of voice frames before the preset voice frame, so as to calculate the feature mean vector.

In this embodiment, the number of the plurality of voice frames before the preset voice frame is between 2 and a total number of voice frames of a sentence. If the total number of the voice frames of a sentence is N, the feature mean vector calculator device 41 obtains the first feature vector of the N voice frames before the preset voice frame, and calculates the feature mean vector, which is expressed by Formula (1) below:

$$\overline{X} = \frac{1}{N}(X_{t-(N-1)} + \ldots + X_{t-2} + X_{t-1} + X_t) \quad (1)$$

where $X_t$ is the first feature vector of the preset voice frame, $X_{t-1}$ to $X_{t-(N-1)}$ are the first feature vectors of the plurality of voice frames before the preset voice frame, N is the number of the voice frames, and $\overline{X}$ is the feature mean vector.

Figure 6:
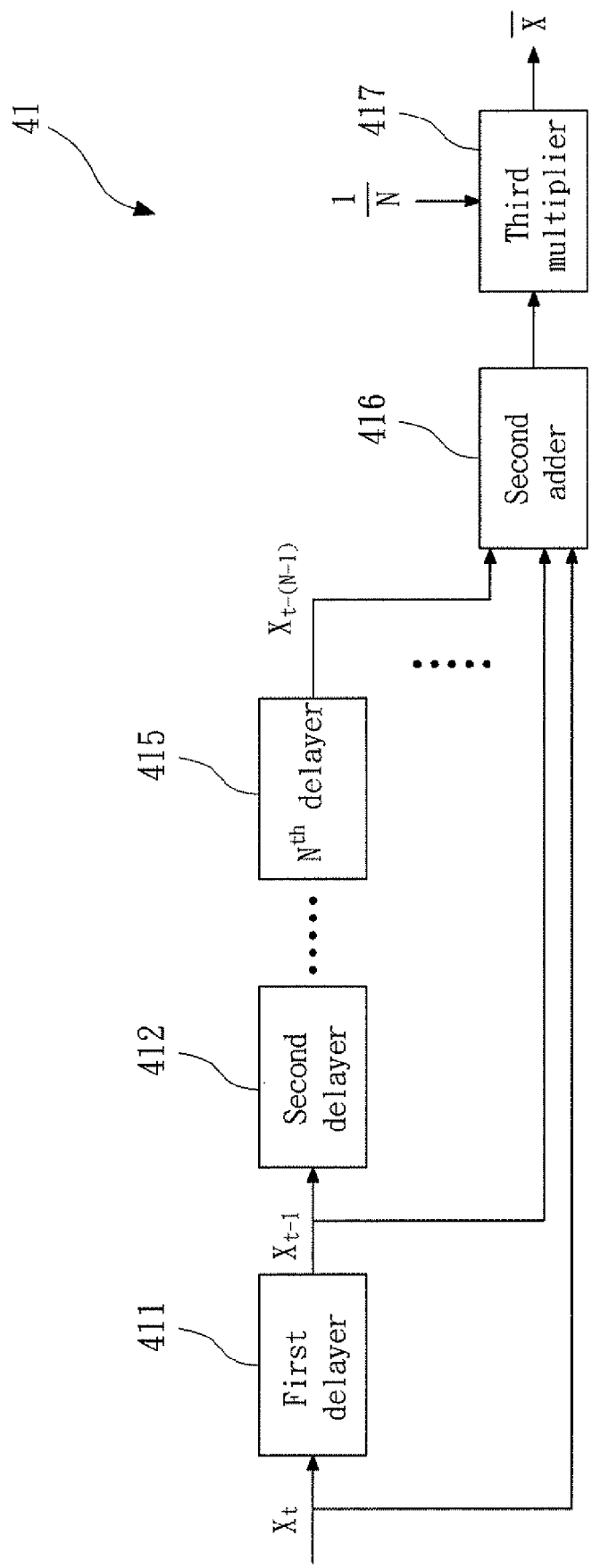
FIG. 6 is a schematic block diagram of a feature mean vector calculator device according to the present invention.

FIG. 6 is a schematic block diagram of the feature mean vector calculator device according to the present invention. The feature mean vector calculator device 41 of the present invention includes a plurality of delayers 411, 412, 415, a second adder 416, and a third multiplier 417. Each delayer delays a unit of time, so as to obtain the first feature vectors of the plurality of voice frames before the preset voice frame. The second adder 416 sums the first feature vectors, so as to calculate a sum of the first feature vectors $(X_{t-(N-1)} + \ldots + X_{t-2} + X_{t-1} + X_t)$. The third multiplier 417 multiplies the sum of the first feature vectors $(X_{t-(N-1)} + \ldots + X_{t-2} + X_{t-1} + X_t)$ with a reciprocal (1/N) of the number of the voice frames, so as to calculate the feature mean vector $\overline{X}$.

Figure 5:
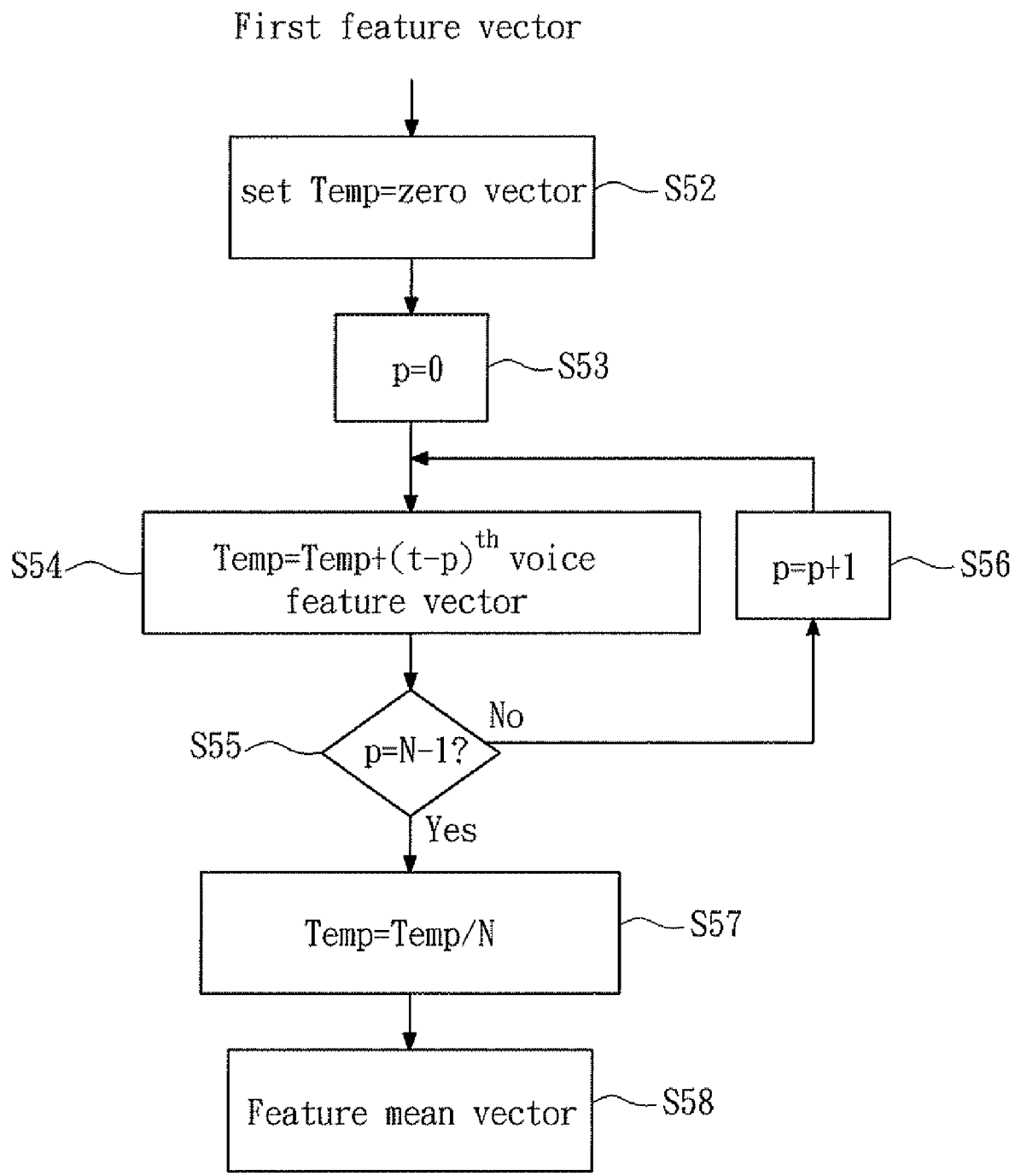
FIG. 5 is a schematic flow chart of the calculation of a feature mean vector according to the present invention.

FIG. 5 is a schematic flow chart of the calculation of the feature mean vector according to the present invention. First, in Step S52, a parameter Temp is set as a zero vector. In Step S53, a parameter p is set as zero, where the p indicates the $p^{th}$ voice frame. In Step S54, the first feature vectors of the preset voice frames are summed to calculate a sum of the first feature vectors. In Steps S55 and S56, whether the $p^{th}$ voice frame has reached N−1 or not is determined. If negative, p is incremented. The step of adding p is the above step of using a delayer to delay a unit of time, so as to obtain the first feature vectors of the plurality of voice frames before the preset voice frame. In Step S57, if the p has reached the number of N−1, the sum of the first feature vectors (Temp) is multiplied with the reciprocal (1/N) of the number of the voice frames. In Step S58, the feature mean vector $\overline{X}$ is calculated.

In the above embodiment, the feature mean vector is calculated through an arithmetic mean. However, in the feature mean vector calculator device and method of the present invention, the mean calculation methods including geometric mean, median, mode, or norm may also be used to calculate the feature mean vector.

In FIG. 4, after the feature mean vector calculator device 41 calculates the feature mean vector, the first multiplier 42 multiplies the feature mean vector ($\overline{X}$) by the negative value (−α) of the first scalar coefficient to calculate a first multiplication result (−α·$\overline{X}$). The first adder 43 adds the first feature vector ($X_t$) of the preset voice frame with the first multiplication result (−α·$\overline{X}$) to calculate an addition result ($X_t$−α·$\overline{X}$). The second multiplier 44 multiplies the first feature vector ($X_t$) of the preset voice frame by the second scalar coefficient (β) to calculate a second multiplication result (β·$X_t$). The comparator 45 compares whether the addition result ($X_t$−α·$\overline{X}$) is greater than the second multiplication result (β·$X_t$), and outputs a control signal to the multiplexer 46. The multiplexer 46 switches the second feature vector ($\hat{X}_t$) of the preset voice frame into the addition result ($X_t$−α·$\overline{X}$) or the second multiplication result (β·$X_t$) according to the control signal.

Therefore, in the system and method of the present invention, after the cepstral noise subtraction device 22 calculates the feature mean vector, the feature vector and the feature mean vector of the preset voice frame are operated under certain conditions, which is expressed by Formula (2):

$$\hat{X}_t = \begin{cases} X_t - \alpha \cdot \overline{X} & \text{if } X_t > \frac{\alpha}{1-\beta} \cdot \overline{X} \\ \beta \cdot X_t & \text{otherwise} \end{cases} \quad (2)$$

where, when the addition result ($X_t$−α·$\overline{X}$) is greater than the second multiplication result (β·$X_t$), the second feature vector ($\hat{X}_t$) of the preset voice frame is the addition result ($X_t$−α·$\overline{X}$), and when the addition result ($X_t$−α·$\overline{X}$) is smaller than the second multiplication result (β·$X_t$), the second feature vector ($\hat{X}_t$) of the preset voice frame is the second multiplication result (β·$X_t$). Moreover, the first scalar coefficient (α) is between 0.01 and 0.99, and the second scalar coefficient (β) is between 0.01 and 0.99.

Figure 3:
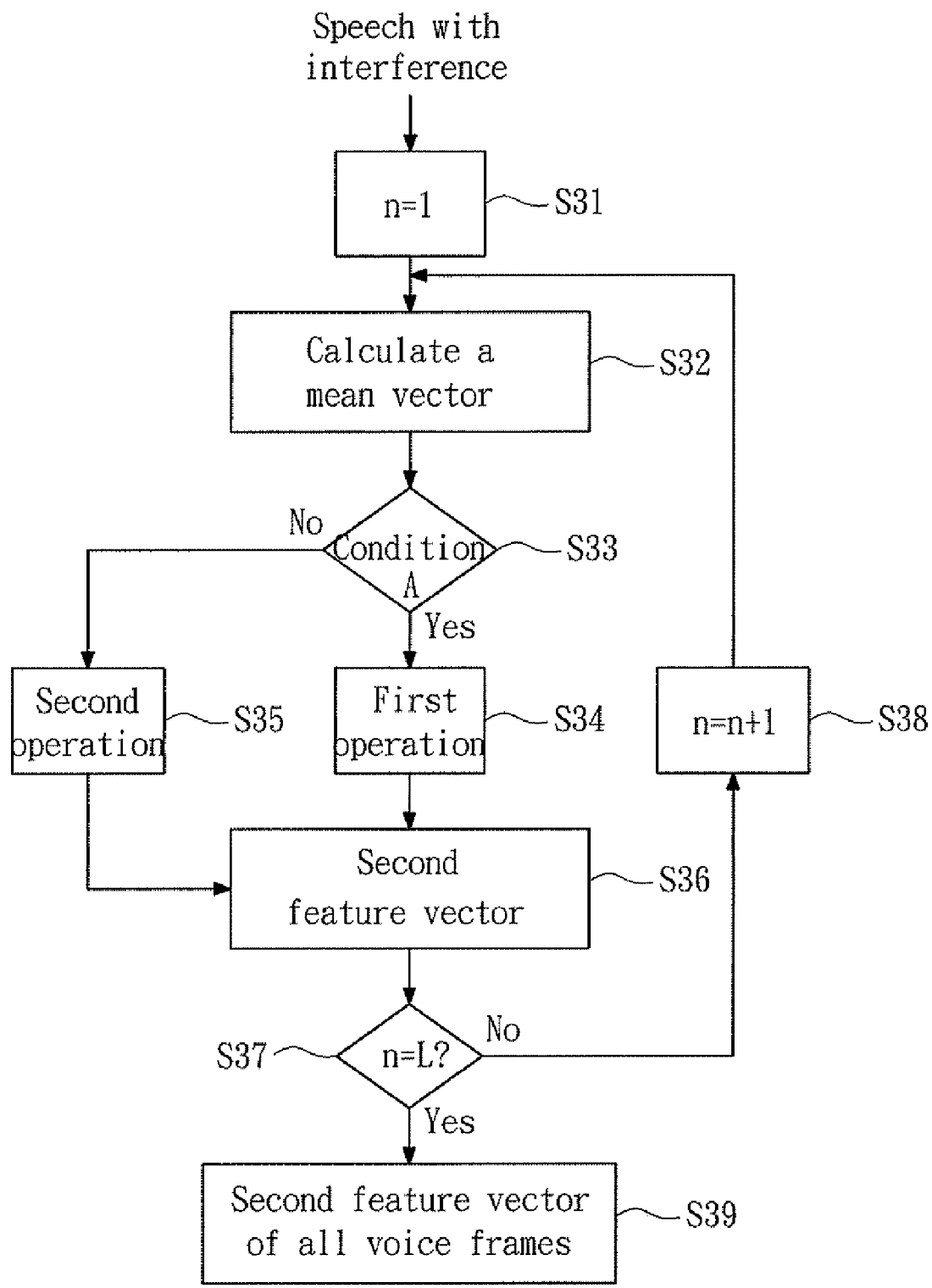
FIG. 3 is a schematic flow chart of the cepstral noise subtraction method according to the present invention.

FIG. 3 is a schematic flow chart of the cepstral noise subtraction method according to the present invention. First, in Step S31, a parameter n is set as 1, where n indicates the $n^{th}$ voice frame, and the input speech is assumed to have L voice frames in this embodiment. In Step S32, the feature mean vector is calculated, which may refer to the description of FIGS. 5 and 6, and will not be repeated herein. Thus, the first feature vector of the preset voice frame (n) and the first feature vectors of the plurality of voice frames before the preset voice frame are obtained to calculate the feature mean vector. Then the feature mean vector ($\overline{X}$) is multiplied by the negative value (−α) of the first scalar coefficient to calculate a first multiplication result (−α·$\overline{X}$). Then the first feature vector ($X_t$) of the preset voice frame is added to the first multiplication result (−α·$\overline{X}$) to calculate the addition result ($X_t$−α·$\overline{X}$). Then, the first feature vector ($X_t$) of the preset voice frame is multiplied by the second scalar coefficient (β) to calculate a second multiplication result (β·$X_t$).

In Step S33, whether a condition A is true or not is determined. The condition A is the condition in the above Formula (2), i.e., whether the addition result ($X_t$−α·$\overline{X}$) is greater than the second multiplication result (β·$X_t$). In Step S34, when the addition result ($X_t$−α·$\overline{X}$) is greater than the second multiplication result (β·$X_t$), a first operation is performed to make the second feature vector ($\hat{X}_t$) of the preset voice frame into the addition result ($X_t$−α·$\overline{X}$). In Step S35, when the addition result ($X_t$−α·$\overline{X}$) is smaller than the second multiplication result (β·$X_t$), a second operation is performed to make the second feature vector ($\hat{X}_t$) of the preset voice frame into the second multiplication result (β·$X_t$). In Step S36, the second feature vector ($\hat{X}_t$) of the preset voice frame is calculated through the above operations.

In Steps S37 and S38, if the input speech in this embodiment is assumed to have L voice frames, the calculation should be performed L times to determine whether the preset voice frame (n) has reached L; if negative, n is incremented. In Step S39, the second feature vectors ($\hat{X}_t$) of all voice frames are calculated.

In FIG. 2, the cepstral converter 23 converts the second feature vector of the preset voice frame into a cepstral feature vector. In this embodiment, the cepstral converter 23 is a discrete cosine transformer, and the cepstral feature vector is a Mel cepstral feature vector. The model trainer 25 calculates a model parameter according to the cepstral feature vector. The speech recognizer 27 calculates the recognized voice signal according to the cepstral feature vector and the model parameter.

The speech recognition system 20 with cepstral noise subtraction of the present invention further includes a differential operator 24 for calculating a first-order difference, or a first-order difference and a second-order difference, or a first-order difference to a high-order difference of the cepstral feature vector. In FIG. 2, the speech passes through the filterbank energy extractor 21, the cepstral noise subtraction device 22, the cepstral converter 23, the differential operator 24, and the speech recognizer 27, and thus, the recognized voice signal is calculated. The right side of the dashed line is referred to as a recognition phase. At the left side of the dashed line, the process through the model trainer 25 and a speech model parameter database 26 is referred to as a training phase. The differential operator 24 may be disposed in the recognition phase or the training phase to perform a difference operation.

The system and method of the present invention conduct experiments under the international standard Aurora-2 speech database environment to evaluate the anti-noise ability. The speech database Aurora-2 used in the experiment is issued by the European Telecommunications Standards Institute (ESTI), and is a consecutive English number speech containing noise. The noise includes eight different kinds of additive noises and two channel effects with different characteristics. The additive noise in the speech database includes airport, babble, car, exhibition, restaurant, subway, street and train station, which are added to clean speech according to different signal-to-noise ratios (SNR). The SNR includes 20 dB, 15 dB, 10 dB, 5 dB, 0 dB, and −5 dB. The channel effect includes two standards,—G.712 and MIRS, established by the International Telecommunication Union (ITU). According to different types of channel noise and additive noise added to the test speech, the Aurora-2 is divided into three test groups, Set A, Set B, and Set C. Set A represents stationary noises, and Set B represents nonstationary noises. Besides the stationary and nonstationary noise, Set C further uses the channel effects G.712 and MIRS that are different from the training speech. The average recognition rate in all kinds of noises is obtained by calculating the average value of 20 dB to 0 dB.

The speech recognition experiment is used together with an HTK (Hidden Markov Model Toolkit) development tool. The HTK is a hidden Markov model (HMM) developed by the electrical mechanism department in Cambridge University. Thus, a speech recognition system with an HMM architecture may be developed conveniently and quickly.

The settings of the acoustic models are described as follows. Each number model (1-9, zero, and oh) is modeled by a continuous density hidden Markov model (CDHMM) in a left-to-right form, and includes 16 states. Each state is modeled by three Gaussian mixture distributions. Moreover, the silence model includes two models, namely a silence model including three states indicating the silence at the beginning and the end of a sentence, and a pause model including 6 states indicating a short intermittence between words in the sentence. All the above training of the acoustic models and all the experiments are accomplished in the Aurora-2 speech database environment working together with the HTK tool suit.

As for the feature extractor, the evaluation experiment on the system and method of the present invention employs the Mel-frequency cepstral coefficients (MFCCs) as the speech feature vectors. The system and method of the present invention perform operations on log Mel filterbank energy excluding the log energy. The log Mel filterbank energy and the Mel-frequency cepstral coefficient are in a linear conversion relationship, and thus, the two are equivalent to each other. The voice frame length is sampled at 25 ms, and the voice frame shift is 10 ms. The information of each voice frame is indicated by 39-dimension, including 12-dimension Mel-frequency cepstral coefficient and 1-dimension log energy. Meanwhile, the first-order difference coefficient (delta coefficient) and the second-order difference coefficient (acceleration coefficient) corresponding to the 13-dimension feature are selected.

Figure 1:
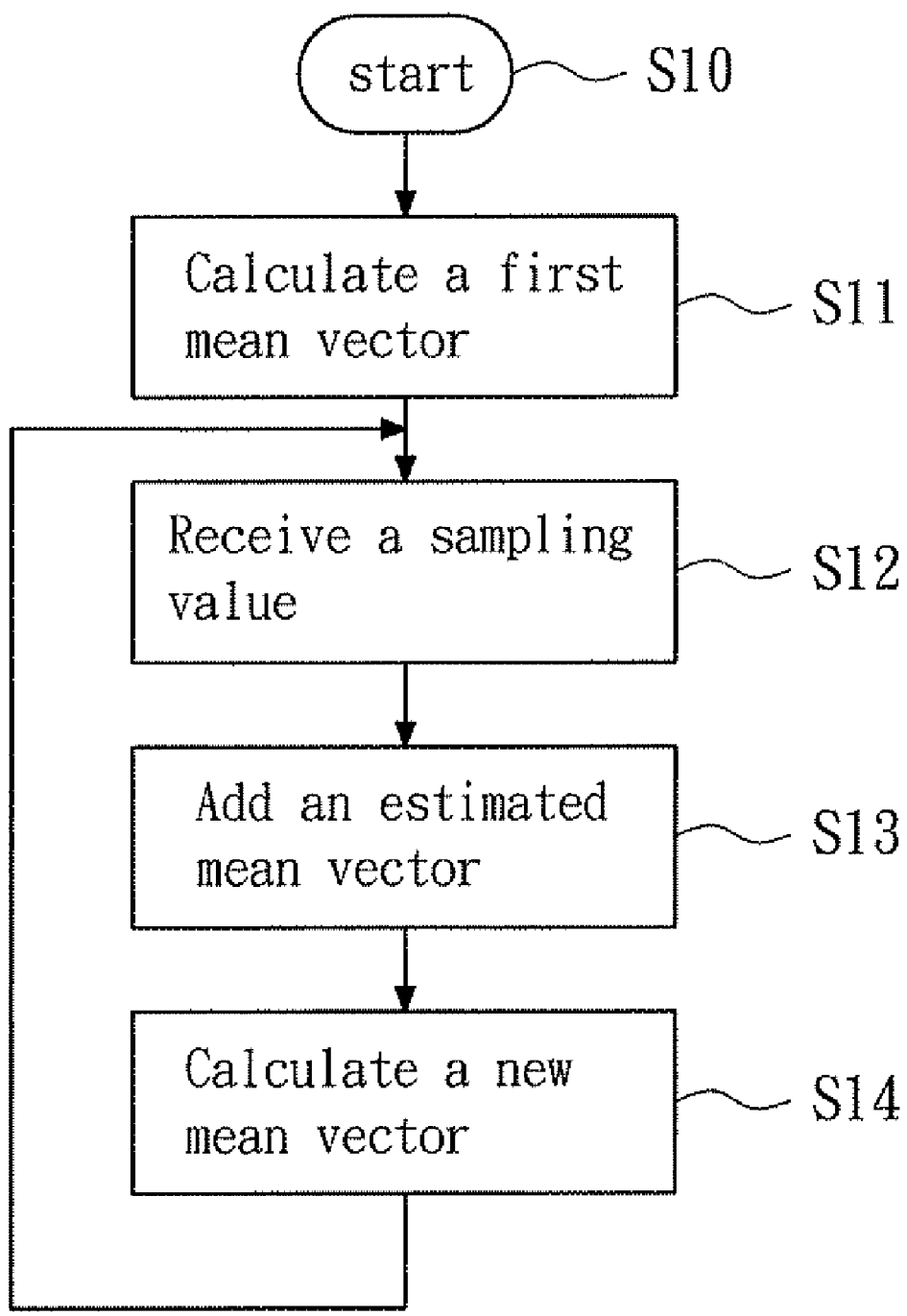
FIG. 1 is a schematic flow chart of a conventional cepstral feature processing method.

The recognition result is shown in FIG. 1. Compared with the cepstral mean substraction (CMS) and the prior American patent (U.S. Pat. No. 6,804,643 B1), the system and method of the present invention have obviously improved word accuracy, and the maximum word accuracy is shown in bold. As for the overall performance of set A, set B, and set C, the system and method of the present invention may effectively improve the anti-noise speech recognition rate, and are also proved to be stable and effective.

The speech recognition system and method limit the process for the cepstral feature vector, so as to avoid excessive enhancement and subtraction in the cepstral feature vector, so that its operation is performed properly to improve anti-noise ability in speech recognition. Furthermore, the speech recognition system and method can be applied in any environment, and have a low complexity and can be easily integrated into other systems, so as to provide the user with a more reliable and stable speech recognition result.

While the embodiment of the present invention have been illustrated and described, various modifications and improvements can be made by those skilled in the art. The embodiments of the present invention are therefore described in an illustrative but not restrictive sense. It is intended that the present invention may not be limited to the particular forms as illustrated, and that all modifications that maintain the spirit and scope of the present invention are within the scope as defined in the appended claims.

TABLE 2

The comparison between the word recognition rates of MFCC and three compensation methods in the Aurora-2

(a) MFCC

|         | Subway | Babble | Car    | Exhibition | Average |
|---------|--------|--------|--------|------------|---------|
| Clean   | 98.93  | 99     | 98.96  | 99.2       | 99.0225 |
| 20 dB   | 97.05  | 90.15  | 97.41  | 96.39      | 95.25   |
| 15 dB   | 93.49  | 73.76  | 90.04  | 92.04      | 87.3325 |
| 10 dB   | 78.72  | 49.43  | 67.01  | 75.66      | 67.705  |
| 5 dB    | 52.16  | 26.81  | 34.09  | 44.83      | 39.4725 |
| 0 dB    | 26.01  | 9.28   | 14.46  | 18.05      | 16.95   |
| −5 dB   | 11.18  | 1.57   | 9.39   | 9.6        | 7.935   |
| Average | 69.486 | 49.886 | 60.602 | 65.394     | 61.342  |

TABLE 2-continued

The comparison between the word recognition rates of
MFCC and three compensation methods in the Aurora-2

|  | Restaurant | Street | Airport | Train-statio | Average |
|---|---|---|---|---|---|
| Clean | 98.93 | 99 | 98.96 | 99.2 | 99.0225 |
| 20 dB | 89.99 | 95.74 | 90.64 | 94.72 | 92.7725 |
| 15 dB | 76.24 | 88.45 | 77.01 | 83.65 | 81.3375 |
| 10 dB | 54.77 | 67.11 | 53.86 | 60.29 | 59.0075 |
| 5 dB | 31.01 | 38.45 | 30.33 | 27.92 | 31.9275 |
| 0 dB | 10.96 | 17.84 | 14.41 | 11.57 | 13.695 |
| −5 dB | 3.47 | 10.46 | 8.23 | 8.45 | 7.6525 |
| Average | 52.594 | 61.518 | 53.25 | 55.63 | 55.748 |

|  | Subway (MIRS) | Street (MIRS) | Average |
|---|---|---|---|
| Clean | 99.14 | 98.97 | 99.055 |
| 20 dB | 93.46 | 95.13 | 94.295 |
| 15 dB | 86.77 | 88.91 | 87.84 |
| 10 dB | 73.9 | 74.43 | 74.165 |
| 5 dB | 51.27 | 49.21 | 50.24 |
| 0 dB | 25.42 | 22.91 | 24.165 |
| −5 dB | 11.82 | 11.15 | 11.485 |
| Average | 66.164 | 66.118 | 66.141 |

(b) CMS

|  | Subway | Babble | Car | Exhibition | Average |
|---|---|---|---|---|---|
| Clean | 98.93 | 99.09 | 99.02 | 99.04 | 99.02 |
| 20 dB | 95.67 | 94.11 | 96.72 | 94.48 | 95.245 |
| 15 dB | 89.32 | 81.41 | 89.56 | 85.84 | 86.5325 |
| 10 dB | 68.96 | 57.07 | 67.94 | 64.05 | 64.505 |
| 5 dB | 38.56 | 28.48 | 34.95 | 31.04 | 33.2575 |
| 0 dB | 16.79 | 10.7 | 14.08 | 9.53 | 12.775 |
| −5 dB | 11.39 | 4.78 | 8.92 | 7.37 | 8.115 |
| Average | 61.86 | 54.354 | 60.65 | 56.988 | 58.463 |

|  | Restaurant | Street | Airport | Train-statio | Average |
|---|---|---|---|---|---|
| Clean | 98.93 | 99.09 | 99.02 | 99.04 | 99.02 |
| 20 dB | 92.91 | 95.65 | 94.63 | 96.14 | 94.8325 |
| 15 dB | 80.56 | 88.39 | 85.36 | 87.2 | 85.3775 |
| 10 dB | 61.22 | 66.17 | 66.33 | 66.21 | 64.9825 |
| 5 dB | 35.68 | 38.33 | 37.52 | 34.46 | 36.4975 |
| 0 dB | 13.42 | 16.81 | 18.22 | 14.13 | 15.645 |
| −5 dB | 5.65 | 10.31 | 7.99 | 8.33 | 8.07 |
| Average | 56.758 | 61.07 | 60.412 | 59.628 | 59.467 |

|  | Subway (MIRS) | Street (MIRS) | Average |
|---|---|---|---|
| Clean | 99.08 | 99.06 | 99.07 |
| 20 dB | 95.52 | 96.1 | 95.81 |
| 15 dB | 89.13 | 90.3 | 89.715 |
| 10 dB | 71.32 | 73.13 | 72.225 |
| 5 dB | 38.47 | 44.95 | 41.71 |
| 0 dB | 15.08 | 18.86 | 16.97 |
| −5 dB | 11.54 | 11.22 | 11.38 |
| Average | 61.904 | 64.668 | 63.286 |

(c) Prior art (U.S. Pat. No. 6,804,643 B1)

|  | Subway | Babble | Car | Exhibition | Average |
|---|---|---|---|---|---|
| Clean | 97.73 | 97.34 | 97.7 | 98.49 | 97.815 |
| 20 dB | 92.69 | 92.41 | 93.53 | 90.96 | 92.3975 |
| 15 dB | 83.79 | 80.99 | 84.82 | 80.41 | 82.5025 |
| 10 dB | 66.99 | 60.4 | 62.87 | 62.02 | 63.07 |
| 5 dB | 42.77 | 31.47 | 32.03 | 35.98 | 35.5625 |
| 0 dB | 22.04 | 14.24 | 12.2 | 15.06 | 15.885 |
| −5 dB | 13.94 | 9.46 | 9.07 | 9.07 | 10.385 |
| Average | 61.656 | 55.902 | 57.09 | 56.886 | 57.8835 |

|  | Restaurant | Street | Airport | Train-statio | Average |
|---|---|---|---|---|---|
| Clean | 97.73 | 97.34 | 97.7 | 98.49 | 97.815 |
| 20 dB | 91.74 | 92.26 | 91.83 | 93.52 | 92.3375 |
| 15 dB | 80.78 | 83.62 | 81.15 | 82.32 | 81.9675 |
| 10 dB | 60.39 | 63.39 | 60.39 | 60.04 | 61.0525 |
| 5 dB | 34.45 | 37.7 | 33.1 | 30.82 | 34.0175 |
| 0 dB | 14.52 | 16.87 | 18.88 | 12.03 | 15.575 |
| −5 dB | 7.95 | 10.43 | 10.77 | 8.05 | 9.3 |
| Average | 56.376 | 58.768 | 57.07 | 55.746 | 56.99 |

|  | Subway (MIRS) | Street (MIRS) | Average |
|---|---|---|---|
| Clean | 97.05 | 97.1 | 97.075 |
| 20 dB | 86.34 | 89.51 | 87.925 |
| 15 dB | 75.28 | 79.9 | 77.59 |
| 10 dB | 57.94 | 63.45 | 60.695 |
| 5 dB | 35.62 | 41.17 | 38.395 |
| 0 dB | 19.1 | 19.26 | 19.18 |
| −5 dB | 13.94 | 10.52 | 12.23 |
| Average | 54.856 | 58.658 | 56.757 |

(d) The present invention

|  | Subway | Babble | Car | Exhibition | Average |
|---|---|---|---|---|---|
| Clean | 98.74 | 99 | 98.87 | 99.11 | 98.93 |
| 20 dB | 96.87 | 95.22 | 97.2 | 95.19 | 96.12 |
| 15 dB | 93.21 | 84.98 | 93.11 | 90.19 | 90.3725 |
| 10 dB | 77.74 | 62.03 | 73.64 | 71.8 | 71.3025 |
| 5 dB | 46.91 | 31.62 | 37.16 | 38.66 | 38.5875 |
| 0 dB | 20.97 | 13.03 | 12.29 | 13.48 | 14.9425 |
| −5 dB | 11.27 | 6.32 | 8.92 | 8.42 | 8.7325 |
| Average | 67.14 | 57.376 | 62.68 | 61.864 | 62.265 |

|  | Restaurant | Street | Airport | Train-statio | Average |
|---|---|---|---|---|---|
| Clean | 98.74 | 99 | 98.87 | 99.11 | 98.93 |
| 20 dB | 94.47 | 96.7 | 96.15 | 96.7 | 96.005 |
| 15 dB | 84.89 | 90.99 | 89.83 | 89.51 | 88.805 |
| 10 dB | 64.54 | 72.34 | 70.18 | 71.18 | 69.56 |
| 5 dB | 37.89 | 41.66 | 39.9 | 37.15 | 39.15 |
| 0 dB | 16.12 | 17.2 | 18.76 | 11.94 | 16.005 |
| −5 dB | 7.03 | 10.61 | 9.13 | 7.25 | 8.505 |
| Average | 59.582 | 63.778 | 62.964 | 61.296 | 61.905 |

|  | Subway (MIRS) | Street (MIRS) | Average |
|---|---|---|---|
| Clean | 98.89 | 99.03 | 98.96 |
| 20 dB | 96.1 | 96.67 | 96.385 |
| 15 dB | 92.26 | 93.17 | 92.715 |
| 10 dB | 79.46 | 80.47 | 79.965 |
| 5 dB | 52.29 | 51.03 | 51.66 |
| 0 dB | 21.52 | 21.64 | 21.58 |
| −5 dB | 12.25 | 10.52 | 11.385 |
| Average | 68.326 | 68.596 | 68.461 |

What is claimed is:

1. A speech recognition system with cepstral noise subtraction, comprising:
   a filterbank energy extractor, for obtaining a plurality of first feature vectors according to a voice signal;
   a cepstral noise subtraction device, for obtaining a first feature vector of a preset voice frame and first feature vectors of a plurality of voice frames before the preset voice frame, so as to calculate a feature mean vector, and calculate a second feature vector of a preset voice frame according to the first feature vector, the feature mean vector, a first scalar coefficient, and a second scalar coefficient of the preset voice frame;
   a cepstral converter, for converting the second feature vector of the preset voice frame into a cepstral feature vector;
   a model trainer, for calculating a model parameter according to the cepstral feature vector; and
   a speech recognizer, for calculating a recognized voice signal according to the cepstral feature vector and the model parameter.

2. The speech recognition system according to claim 1, wherein the cepstral noise subtraction device comprises:
- a feature mean vector calculator device, for obtaining the first feature vector of the preset voice frame and the first feature vectors of the plurality of voice frames before the preset voice frame, so as to calculate the feature mean vector;
- a first multiplier, for multiplying the feature mean vector by a negative value of the first scalar coefficient, so as to calculate a first multiplication result;
- a first adder, for adding the first feature vector of the preset voice frame with the first multiplication result, so as to calculate an addition result;
- a second multiplier, for multiplying the first feature vector of the preset voice frame by the second scalar coefficient, so as to calculate a second multiplication result;
- a comparator, for comparing whether the addition result is greater than the second multiplication result, and outputting a control signal; and
- a multiplexer, for switching the second feature vector of the preset voice frame into the addition result or the second multiplication result according to the control signal.

3. The speech recognition system according to claim 2, wherein when the addition result is greater than the second multiplication result, the second feature vector of the preset voice frame is the addition result, and when the addition result is smaller than the second multiplication result, the second feature vector of the preset voice frame is the second multiplication result.

4. The speech recognition system according to claim 3, wherein the first scalar coefficient is between 0.01 and 0.99, and the second scalar coefficient is between 0.01 and 0.99.

5. The speech recognition system according to claim 2, wherein the feature mean vector calculator device comprises:
- a plurality of delayers, each delaying a unit of time to obtain the first feature vectors of the plurality of voice frames before the preset voice frame;
- a second adder, for summing the first feature vectors, so as to calculate a sum of the first feature vectors; and
- a third multiplier, for multiplying the sum of the first feature vectors by a reciprocal of the number of the voice frames, so as to calculate the feature mean vector.

6. The speech recognition system according to claim 2, wherein the feature mean vector calculator device calculates the feature mean vector through mean calculation methods including geometric mean, median, mode, or norm.

7. The speech recognition system according to claim 1, wherein a number of the plurality of voice frames before the preset voice frame is between 2 and the total number of voice frames of a sentence.

8. The speech recognition system according to claim 1, further comprising a differential operator for calculating a first-order difference, or a first-order difference and a second-order difference, or a first-order difference to a high-order difference of the cepstral feature vector.

9. The speech recognition system according to claim 1, wherein the filterbank energy extractor is a log Mel filterbank energy extractor.

10. The speech recognition system according to claim 9, wherein the cepstral converter is a discrete cosine transformer.

11. A speech recognition method with cepstral noise subtraction, comprising:
- obtaining a plurality of first feature vectors according to a voice signal;
- obtaining a first feature vector of a preset voice frame and first feature vectors of a plurality of voice frames before the preset voice frame, so as to calculate a feature mean vector;
- calculating a second feature vector of a preset voice frame according to the first feature vector, the feature mean vector, a first scalar coefficient, and a second scalar coefficient of the preset voice frame;
- converting the second feature vector of the preset voice frame into a cepstral feature vector;
- calculating a model parameter according to the cepstral feature vector; and
- calculating a recognized voice signal according to the cepstral feature vector and the model parameter.

12. The speech recognition method according to claim 11, wherein the step of calculating a second feature vector of the preset voice frame further comprises:
- obtaining the first feature vector of the preset voice frame and first feature vectors of the plurality of voice frames before the preset voice frame, so as to calculate the feature mean vector;
- multiplying the feature mean vector by a negative value of the first scalar coefficient, so as to calculate a first multiplication result;
- adding the first feature vector of the preset voice frame with the first multiplication result, so as to calculate an addition result;
- multiplying the first feature vector of the preset voice frame with the second scalar coefficient, so as to calculate a second multiplication result;
- comparing whether the addition result is greater than the second multiplication result, and outputting a control signal; and
- switching the second feature vector of the preset voice frame into the addition result or the second multiplication result according to the control signal.

13. The speech recognition method according to claim 12, wherein when the addition result is greater than the second multiplication result, the second feature vector of the preset voice frame is the addition result, and when the addition result is smaller than the second multiplication result, the second feature vector of the preset voice frame is the second multiplication result.

14. The speech recognition method according to claim 11, wherein the step of calculating a feature mean vector further comprises:
- using a plurality of delayers each delaying a unit of time to obtain the first feature vectors of the plurality of voice frames before the preset voice frame;
- summing the first feature vectors to calculate a sum of the first feature vectors; and
- multiplying the sum of the first feature vectors with a reciprocal of the number of the voice frames, so as to calculate the feature mean vector.

15. The speech recognition method according to claim 11, wherein the feature mean vector is calculated through mean calculation methods including geometric mean, median, mode, or norm.

16. The speech recognition method according to claim 11, further comprising a difference operation step, for calculating a first-order difference, or a first-order difference and a second-order difference, or a first-order difference to a high-order difference of the cepstral feature vector.

17. The speech recognition method according to claim 11, wherein the first feature vectors are log Mel filterbank energy feature vectors.

18. The speech recognition method according to claim 11, wherein the cepstral feature vector is a Mel cepstral feature vector.

* * * * *